US012574287B2

(12) United States Patent
Mahajan et al.

(10) Patent No.: US 12,574,287 B2
(45) Date of Patent: Mar. 10, 2026

(54) DETERMINING INTERNET PROTOCOL (IP) ADDRESSES FOR SCANNING IN WIRELESS NETWORK

(71) Applicant: RAKUTEN MOBILE, INC., Tokyo (JP)

(72) Inventors: Pratik Mahajan, Indore (IN); Nitish Kumar, Indore (IN); Mohammodh Irfan, Indore (IN); Pawan Shriwas, Indore (IN); Niyank Bam, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 282 days.

(21) Appl. No.: 18/022,774

(22) PCT Filed: Dec. 23, 2022

(86) PCT No.: PCT/US2022/053940
§ 371 (c)(1),
(2) Date: Feb. 23, 2023

(87) PCT Pub. No.: WO2024/102150
PCT Pub. Date: May 16, 2024

(65) Prior Publication Data
US 2025/0080419 A1     Mar. 6, 2025

(30) Foreign Application Priority Data
Nov. 10, 2022     (IN) ............................. 202241064337

(51) Int. Cl.
*G06F 15/173*     (2006.01)
*G06F 15/16*     (2006.01)
(Continued)

(52) U.S. Cl.
CPC ........ *H04L 41/085* (2013.01); *H04L 61/5007* (2022.05)

(58) Field of Classification Search
CPC . H04L 61/5007; H04L 61/5014; H04L 61/50; H04L 41/085
(Continued)

(56) References Cited

U.S. PATENT DOCUMENTS 11,470,040 B2 * 10/2022 Snehashis ........... H04L 61/5007
11,720,685 B2 *  8/2023 Gwilliams .......... H04L 63/1433
                                                                    726/25
(Continued)

OTHER PUBLICATIONS

International Search Report issued Mar. 27, 2023 in Application No. PCT/US22/53940.
(Continued)

*Primary Examiner* — Bharat Barot
(74) *Attorney, Agent, or Firm* — Sughrue Mion, PLLC

(57)     ABSTRACT

Embodiments herein provide a method for determining IP addresses for scanning in wireless network by a system (100). The method includes storing a plurality of IP scan configurations corresponding to various network elements in a database (108). Each of the IP scan configuration includes a plurality of IP parameters corresponding to each bit of an IP schema, where each IP parameter of the plurality of IP parameters is defined by a user. Further, the method includes receiving a request to determine a list of IP addresses required to be scanned corresponding to a network element. Further, the method includes retrieving the IP scan configuration corresponding to the network element from the database. Further, the method includes determining the list of IP addresses to be scanned based on the retrieved IP scan configuration. Further, the method includes displaying the list of IP addresses to the user.

18 Claims, 5 Drawing Sheets

(51) Int. Cl.
  *H04L 41/085* (2022.01)
  *H04L 61/5007* (2022.01)
(58) Field of Classification Search
  USPC .................................. 709/223–224, 245–246
  See application file for complete search history.

(56) References Cited

U.S. PATENT DOCUMENTS

| | | | |
|---|---|---|---|
| 12,058,156 B2 * | 8/2024 | Fite ..................... | H04L 63/1425 |
| 12,081,578 B2 * | 9/2024 | Hayman ............. | H04L 63/1433 |
| 2005/0114625 A1 * | 5/2005 | Snyder .................... | H04L 41/08 |
| | | | 712/1 |
| 2013/0003727 A1 | 1/2013 | Ramaraj et al. | |
| 2015/0003237 A1 | 1/2015 | Guerra et al. | |
| 2017/0337051 A1 * | 11/2017 | Bertani ............... | H04L 61/5007 |
| 2020/0044920 A1 * | 2/2020 | Patterson ............ | H04L 41/0806 |

OTHER PUBLICATIONS

Written Opinion issued Mar. 27, 2023 in Application No. PCT/US22/53940.

* cited by examiner

DETERMINING INTERNET PROTOCOL (IP) ADDRESSES FOR SCANNING IN WIRELESS NETWORK

FIELD OF INVENTION

The present disclosure relates to an Internet Protocol (IP) scanning method, and more particularly to a method and a system for determining IP addresses for scanning in a wireless network.

BACKGROUND

In general, Internet Protocol (IP) addresses are unique identifiers for each device within a network. The IP addresses assists with a network interface identification as well as location information. In existing IP scanning, a network identifier (ID) or list of IPs are provided in a system for IP scanning. Based on the network ID or the list of IPs, all possible scanned IPs obtain in the network. In some scenario, exact IP list is provided for the IP scanning. In existing methods, a user (or "operator") will either need to manually identify exact IP address list that needs to be scanned which is error prone and critical. Even in a network ID input, the calculated IP address list may be in quintillions (many trillions) in case of IPv6 (for example) which will have high time consumption and infrastructure resource usage. Also, there might be many IP address as per planning, the user does not want to scan, but still need to scan in case of the network ID. Hence, there is problem of overutilization of the infrastructure resource and time-consuming approach specially in case of the IPV6. The same problem is also applicable to other versions of the IP addresses.

Thus, it is desired to address the above-mentioned disadvantages or other shortcomings or at least provide a useful alternative.

OBJECT OF INVENTION

The principal object of the embodiments herein is to provide a method and a system for determining IP addresses for scanning in a wireless network.

Another object of the embodiments herein is to compute an IP address from a defined IP scan configuration, where a subpart configuration will be utilized to compute the IP address. In an IP scan configuration, a user of the system defines subpart of IPs as a constant, range and discrete values and based on these configuration's permutation and combination IP addresses can be calculated that are required to be scanned. Thus, results in assisting for reducing the unwanted IP scanning and hence will optimize the performance of scanning corresponding to a domain, a network service and a network element.

Another object of the embodiments herein is to standardize different IP scanning requirements and control of scanning the required IPs as per user's need. Also, the proposed method can be used to assist for reducing the unwanted IP scanning and hence will optimize the performance of overall scanning by reducing the calculation time and infrastructure usage.

SUMMARY

Accordingly, the embodiment herein disclose a method for determining Internet Protocol (IP) addresses for scanning in a wireless network. The method includes storing a plurality of IP scan configurations corresponding to various network elements in a database. Each of the IP scan configuration includes a plurality of IP parameters corresponding to each bit of an IP schema, where each IP parameter of the plurality of IP parameters is defined by a user. Further, the method includes receiving a request to determine a list of IP addresses required to be scanned corresponding to a network element from the various network elements. Further, the method includes retrieving the IP scan configuration corresponding to the network element from the database. Further, the method includes determining the list of IP addresses to be scanned based on the retrieved IP scan configuration. Further, the method includes displaying the list of IP addresses to the user.

Accordingly, the embodiment herein disclose a system for determining IP addresses for scanning in a wireless network. The system includes a processor communicatively coupled to a memory. The processor is configured to store a plurality of IP scan configurations corresponding to various network elements in a database. Each of the IP scan configuration includes a plurality of IP parameters corresponding to each bit of an IP schema. Each IP parameter of the plurality of IP parameters is defined by a user. Further, the processor is configured to receive a request to determine a list of IP addresses required to be scanned corresponding to a network element. Further, the processor is configured to retrieve the IP scan configuration corresponding to the network element from the database. Further, the processor is configured to determine the list of IP addresses to be scanned based on the retrieved IP scan configuration. Further, the processor is configured to display the list of IP addresses to the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

The method and the system are illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
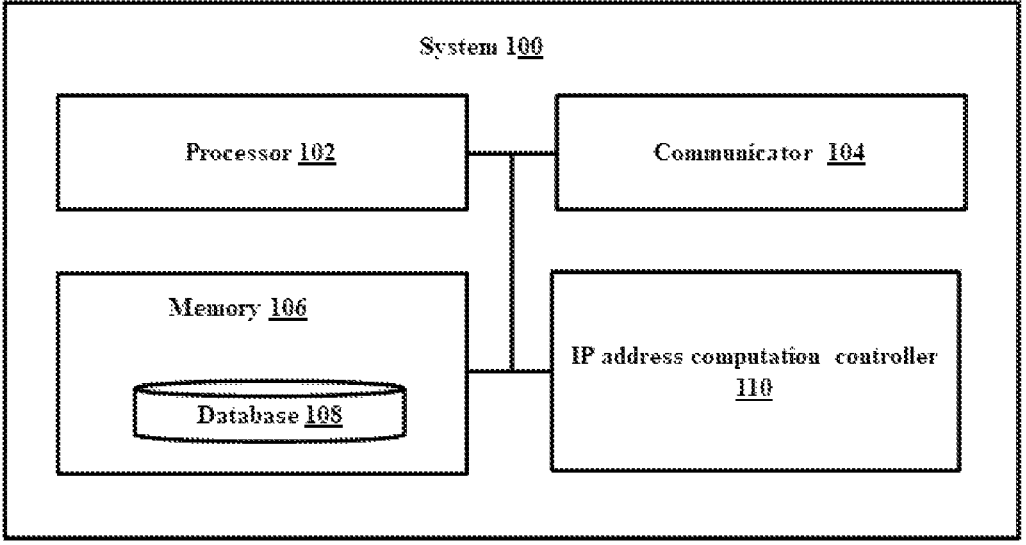
FIG. 1 shows various hardware components of a system for determining IP addresses for scanning in a wireless network, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for determining IP addresses for scanning in a wireless network. The method includes storing a plurality of IP scan configurations corresponding to various network elements in a database. Each of the IP scan configuration includes a plurality of IP parameters corresponding to each bit of an IP schema, where each IP parameter of the plurality of IP parameters is defined by a user. Further, the method includes receiving a request to determine a list of IP addresses required to be scanned corresponding to a network element from the various network elements. Further, the method includes retrieving the IP scan configuration corresponding to the network element from the database. Further, the method includes determining the list of IP addresses to be scanned based on the retrieved IP scan configuration. Further, the method includes displaying the list of IP addresses to the user.

Unlike conventional methods and systems, the proposed method can be used to compute an IP address from a defined IP scan configuration, where a subpart configuration will be utilized to compute the IP address. In IP scan configuration, a user of the system defines subpart of IPs as constant, range and discrete values and based on these configuration's permutation and combination IP addresses can be calculated which are required to be scanned. Thus, results in assisting for reducing the unwanted IP scanning and hence will optimize the performance of scanning corresponding to a domain, a network service and a network element.

The proposed method can be used to standardize different IP scanning requirements and control of scanning the required IPs as per user's need. Also, the proposed method can be used to assist for reducing the unwanted IP scanning and hence will optimize the performance of overall scanning by reducing the calculation time and infrastructure usage.

Referring now to the drawings and more particularly to FIGS. 1 through 4, where similar reference characters denote corresponding features consistently throughout the figures, there are shown preferred embodiments.

FIG. 1 shows various hardware components of a system (100) for determining Internet Protocol (IP) addresses for scanning in a wireless network, according to the embodiments as disclosed herein. The system (100) can be, for example, but not limited to a computer system, a host server, a personal computer, a smart phone, a Personal Digital Assistant (PDA), a tablet computer, a laptop computer, an Internet of Things (IoT), embedded systems, edge devices, a vehicle to everything (V2X) device or the like. The wireless network can be, for example, but not limited to, a fourth generation (4G) network, a fifth generation (5G) network, a sixth generation (6G) network, an open radio access network (ORAN) network or the like.

In an embodiment, the system (100) is hosted on a cloud architecture (not shown). In some embodiment, the system 100 includes components described hereinafter in FIG. 4. In some embodiments, the system (100) hosts a cluster of servers, such as a cloud service. In some embodiments, the system (100) hosts a public cloud. In some embodiments, the system (100) hosts a private cloud.

In an embodiment, the system (100) includes a processor (102), a communicator (104), a memory (106) having a database (108) and an IP address computation controller (110). The processor (102) is coupled with the communicator (104), the memory (106) and the IP address computation controller (110).

The IP address computation controller (110) stores a plurality of IP scan configurations corresponding to various network elements in the database (108). The network element can be, for example, but not limited to an network interface, a category of a device in the wireless network, a type of device in the wireless network, a vendor or operator of the device in the wireless network, a service category of the device in the wireless network, and a network interface in the wireless network. Each of the IP scan configuration includes a plurality of IP parameters corresponding to each bit of an IP schema. The plurality of IP parameters can be, for example, but not limited to a constant value, a discrete value, a sequential range value or the like. The constant value is fixed value on an IP address position. The sequential range value is a value in specific combination of bits in the IP address position where that specific position of the IP gets changed based on configuration and multiple IPs can be generated based on variable value of position. The discrete value is a variable value in specific combination of bits in IP address position where that specific position of IP gets changed based on configuration and multiple IPs can be generated based on variable value of position. Each IP parameter of the plurality of IP parameters is defined by a user. The plurality of IP parameters includes multiple sequential configuration of the user defined values. The user defined values includes at least one of a constant value which is fixed value on IP address position, a range indicating sequential variable value in specific combination of bits in IP address position, and a discrete value indicating is variable values in specific combination of bits in IP address position. The user defined values can be defined as per IP address schema and required range of IPs.

In an embodiment, the IP schema provides a list of bits that have specific meaning and a means to allocate the bits in specific positions to specific values, a range of values or both based on an IP planning information. In an embodiment, the IP schema is based on IP network parameter information such as the vendor of a device, a service category of a device or a part of the network, a service type or device type specific assignment logic. In an embodiment, the IP Scan configuration vary based on IP Planning of network corresponding to vendor, service category and/or device type. Example Vendor: CISCO, Juniper, Category: IP Transport, Device Type: Router/Switch. There is no specific assignment logic. This is completely dynamic as per IP/Network Planning team.

In an embodiment, the IP address computation controller (110) receives a request to create the IP scan configuration corresponding to the network element. Further, the IP address computation controller (110) receives a set of user defined values corresponding to each IP parameter of the plurality of IP parameters corresponding to positionally encoded bits in the IP schema to create the IP scan configuration for the network element. The set of user defined values corresponding to each IP parameter of the plurality of IP parameters is received by displaying a user interface (e.g., graphical user interface or the like) corresponding to the IP scan configuration. The user interface includes an input filed corresponding to each IP parameter of the plurality of IP parameters corresponding to the positionally encoded bits in the IP schema, and receives the user defined values as an input in the input field corresponding to each IP parameter of the plurality of IP parameters corresponding to the network element. Further, the IP address computation controller (110) creates the IP scan configuration based on the received user defined values corresponding to each IP parameter of the plurality of IP parameters. Further, the IP address computation controller (110) stores the defined IP scan configuration in the database (108).

Further, the IP address computation controller (110) receives a request to determine a list of IP addresses required to be scanned corresponding to the network element. Further, the IP address computation controller (110) retrieves the IP scan configuration corresponding to the network element from the database (108). Based on the retrieved IP scan configuration, the IP address computation controller (110) determines the list of IP addresses to be scanned. In an embodiment, the IP address computation controller (110) detects a plurality of IP addresses corresponding to the network element. Based on permutation and combinations of each IP parameter of the plurality of IP parameters defined by the user in the retrieved IP scan configuration, the IP address computation controller (110) determines the list of IP addresses to be scanned from the plurality of IP addresses. The IP address computation controller (110) stores the list of IP addresses corresponding to the network element for scanning. After storing, whenever the user of the IP address computation controller (110) needs IPs to scan, the user utilizes the IP address computation controller (110) to compute IPs and use the Ips in a quick manner. Further, the IP address computation controller (110) displays the list of IP addresses to the user. Further, the IP address computation controller (110) scans the list of IP addresses corresponding to the network element to optimize performance of the wireless network. In other words, since the calculating only the required IPs corresponding to the scan is good procedure instead of scanning entire network, so as to optimize performance of the wireless network.

The IP address computation controller (110) is implemented by analog and/or digital circuits such as logic gates, integrated circuits, the processor (102), microprocessors, microcontrollers, memory circuits, passive electronic components, active electronic components, optical components, hardwired circuits and the like, and may optionally be driven by firmware.

Further, the processor (102) is configured to execute instructions stored in the memory (106) and to perform various processes. The communicator (104) is configured for communicating internally between internal hardware components and with external devices via one or more networks. The memory (106) also stores instructions to be executed by the processor (102). The memory (106) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (106) may, in some examples, be considered a non-transitory storage medium. The term "non-transitory" may indicate that the storage medium is not embodied in a carrier wave or a propagated signal. However, the term "non-transitory" should not be interpreted that the memory (106) is non-movable. In certain examples, a non-transitory storage medium may store data that can, over time, change (e.g., in Random Access Memory (RAM) or cache).

Unlike conventional systems, the proposed system (100) can be used to compute the IP address from the defined IP scan configuration, where the subpart configuration will be utilized to compute the IP address. In IP scan configuration, the user of the system (100) defines subpart of IPs as constant, range and discrete values and based on these configuration's permutation and combination IP addresses can be calculated which are required to be scanned. Thus, results in assisting for reducing the unwanted IP scanning and hence will optimize the performance of scanning corresponding to the domain, the network service and the network element.

The proposed system (100) can be used to standardize different IP scanning requirements and control of scanning the required IPs as per user's need. Also, the proposed system (100) can be used to assist for reducing the unwanted IP scanning and hence will optimize the performance of overall scanning by reducing the calculation time and infrastructure usage.

Although the FIG. 1 shows various hardware components of the system (100) but it is to be understood that other embodiments are not limited thereon. In other embodiments, the system (100) may include less or more number of components. Further, the labels or names of the components are used only for illustrative purpose and does not limit the scope of the invention. One or more components can be combined together to perform same or substantially similar function in the system (100).

Figure 2:
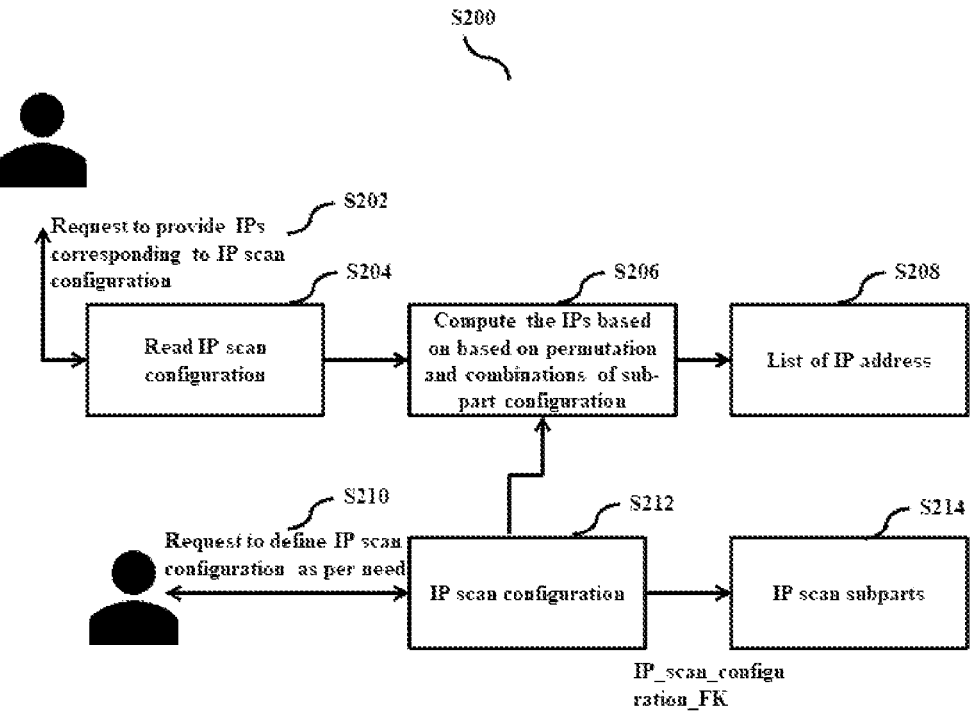
FIG. 2 is an example illustration in which a IP address computation controller included in the system determines the IP addresses for scanning in the wireless network, according to the embodiments as disclosed herein.

FIG. 2 is an example illustration (S200) in which the IP address computation controller (110) included in the system (100) determines the IP addresses for scanning in the wireless network, according to the embodiments as disclosed herein. At S202, the user requests to provide the IPs corresponding to the IP scan configuration. Based on the user request, at S204, the IP address computation controller (110) reads the IP scan configuration. At S206, the IP address computation controller (110) computes the IPs based on based on permutation and combinations of sub-part configuration using the IP scan configuration. At S208, the IP address computation controller (110) provides the list of IP address. At S210, the user requests to define the IP scan configuration as per need. At S212, the IP address computation controller (110) performs the IP scan configuration based on the user request. At S214, the IP address computation controller (110) provides the IP scan subparts using a query (e.g., IP_scan_configuration_FK or the like).

Figure 3A:
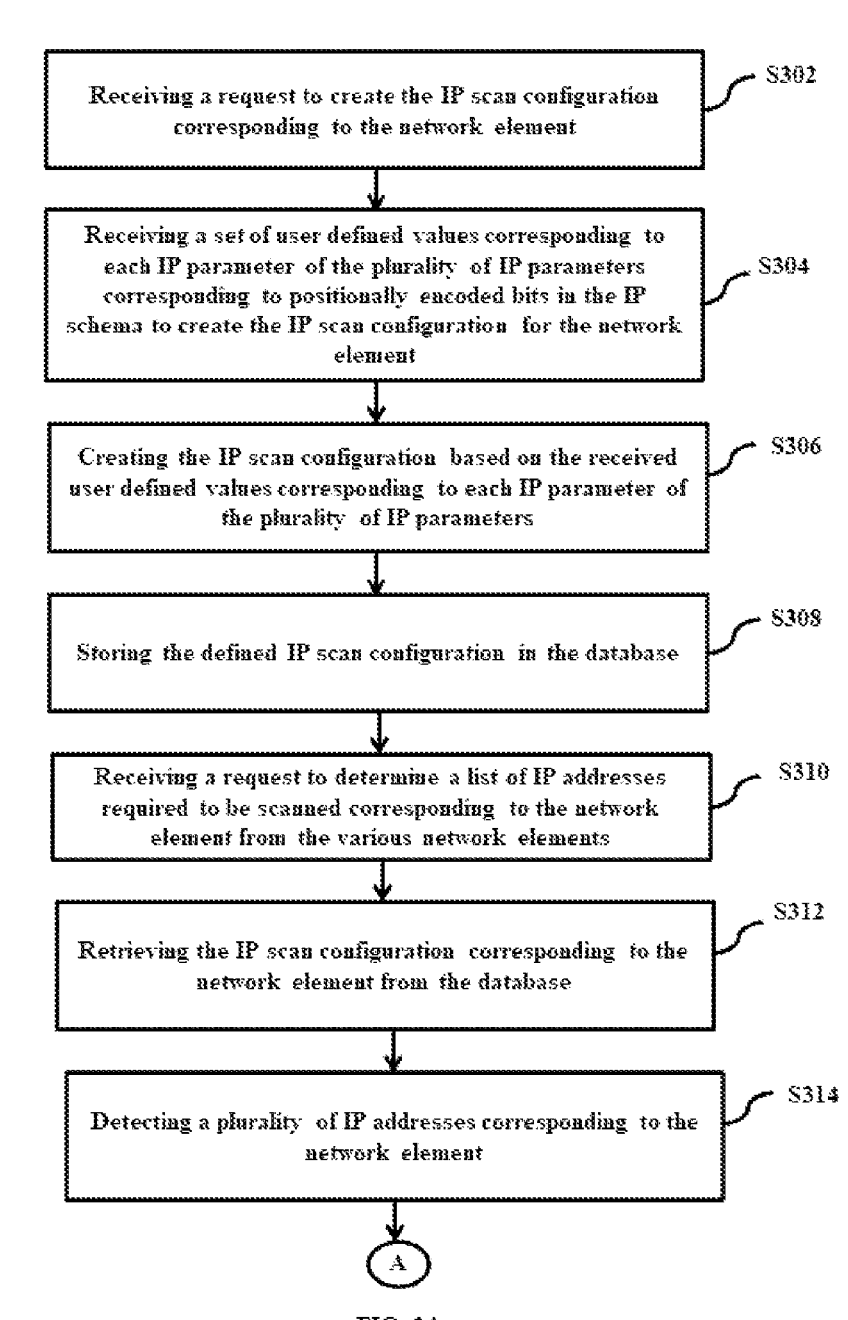
FIG. 3A and FIG. 3B are flow charts illustrating a method for determining IP addresses for scanning in the wireless network, according to the embodiments as disclosed herein.
Figure 3B:
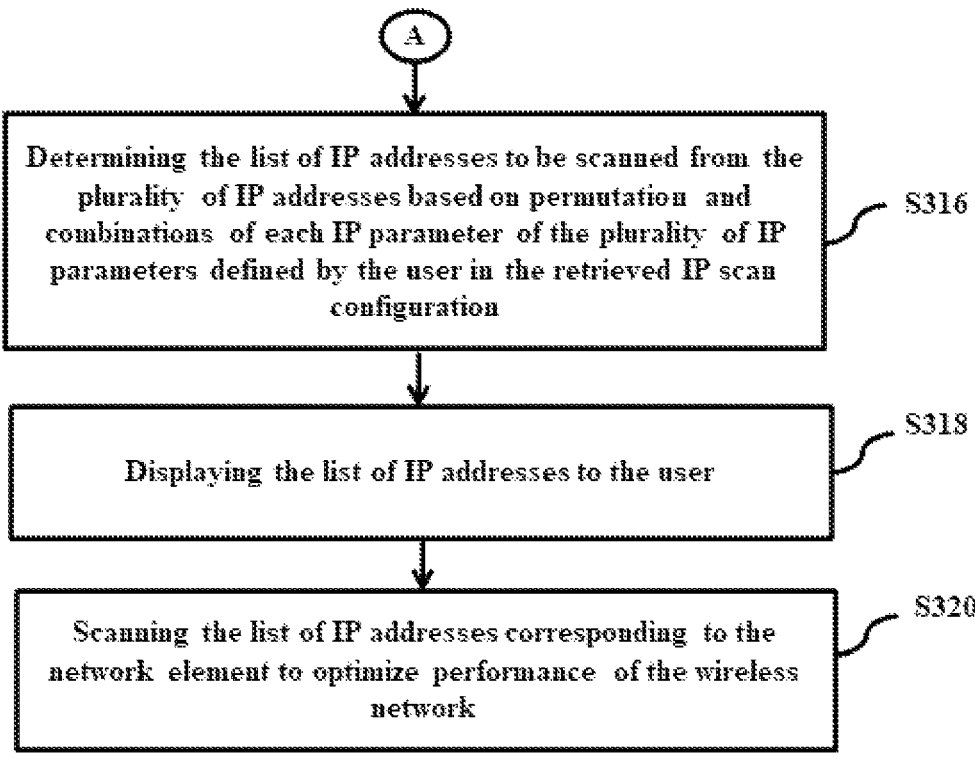

FIG. 3A and FIG. 3B are flow chart (S300) illustrating a method determining the IP addresses for scanning in the wireless network, according to the embodiments as disclosed herein. The operations (S302-S320) are handled by the IP address computation controller (110).

At S302, the method includes receiving the request to create the IP scan configuration corresponding to the network element. At S304, the method includes receiving the set of user defined values corresponding to each IP parameter of the plurality of IP parameters corresponding to positionally encoded bits in the IP schema to create the IP scan configuration for the network element. At S306, the method includes creating the IP scan configuration based on the received user defined values corresponding to each IP parameter of the plurality of IP parameters. At S308, the method includes storing the defined IP scan configuration in the database (108). At S310, the method includes receiving the request to determine the list of IP addresses required to be scanned corresponding to the network element from the various network elements.

At S312, the method includes retrieving the IP scan configuration corresponding to the network element from the database (108). At S314, the method includes detecting the plurality of IP addresses corresponding to the network element. At S316, the method includes determining the list of IP addresses to be scanned from the plurality of IP addresses based on permutation and combinations of each IP parameter of the plurality of IP parameters defined by the user in the retrieved IP scan configuration. At S318, the method includes displaying the list of IP addresses to the user. At S320, the method includes scanning the list of IP addresses corresponding to the network element to optimize performance of the wireless network.

In an embodiment, the method is performed by the system (100) shown in FIG. 1 or a system controller (112) shown in FIG. 4 including sections for performing certain operations, such as the system controller (112) shown in FIG. 4 which will be explained hereinafter.

Unlike conventional methods, the proposed method can be used to compute the IP address from the defined IP scan configuration, where the subpart configuration will be utilized to compute the IP address. In IP scan configuration, the user of the system (100) defines subpart of IPs as constant, range and discrete values and based on these configuration's permutation and combination IP addresses can be calculated which are required to be scanned. Thus, results in assisting for reducing the unwanted IP scanning and hence will optimize the performance of scanning corresponding to the domain, the network service and the network element.

The proposed method can be used to standardize different IP scanning requirements and control of scanning the required IPs as per user's need. Also, the proposed method can be used to assist for reducing the unwanted IP scanning and hence will optimize the performance of overall scanning by reducing the calculation time and infrastructure usage.

The various actions, acts, blocks, steps, or the like in the flow charts (S300) may be performed in the order presented, in a different order or simultaneously. Further, in some embodiments, some of the actions, acts, blocks, steps, or the like may be omitted, added, modified, skipped, or the like without departing from the scope of the invention.

Figure 4:
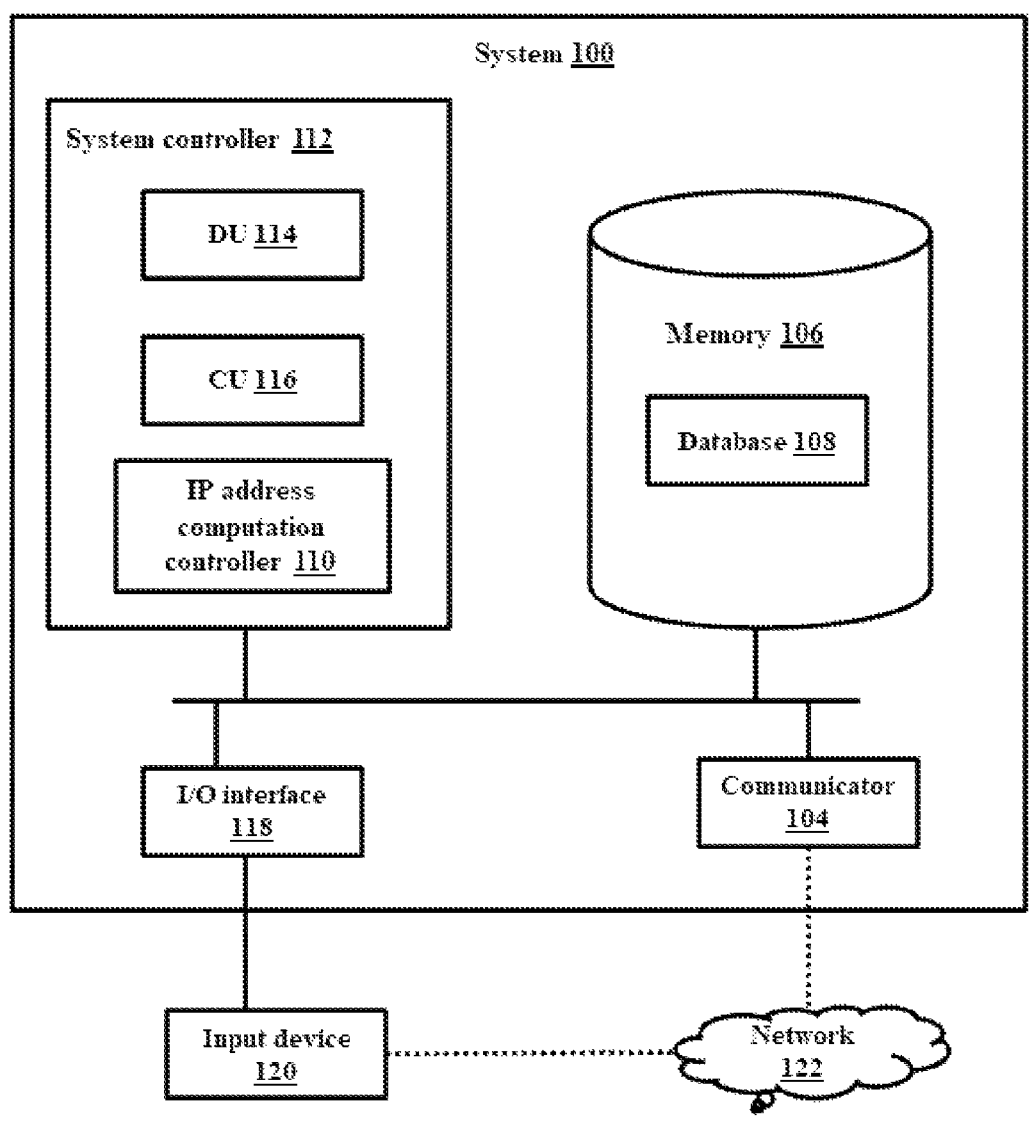
FIG. 4 is an example block diagram of a hardware configuration of the system for determining the IP addresses for scanning in the wireless network, according to the embodiments as disclosed herein.

FIG. 4 is an example block diagram of a hardware configuration of the system (100) for determining the IP addresses for scanning in the wireless network, according to the embodiments as disclosed herein. The hardware configuration includes the system (100), which communicates with a network (122), and interacts with an input device (120). In an embodiment, the system (100) is a computer or other computing device that receives input or commands from the input device (120). In another embodiments, the system (100) is a host server that connects directly to the input device (120), or indirectly through the network (122). In another embodiment, the system (100) is a computer system that includes two or more computers. In another embodiment, the system (100) is a personal computer that executes an application for a user of the system (100).

The system (100) includes a system controller (112), the memory (106), the communicator (104), and an input/output interface (118). In an embodiment, the system controller (112) includes a processor or programmable circuitry executing instructions to cause the processor or programmable circuitry to perform operations according to the instructions. In an embodiment, the system controller (112) includes analog or digital programmable circuitry, or any combination thereof. In another embodiments, the system controller (112) includes a physically separated storage or circuitry (not shown) that interacts through communication. In an embodiments, the memory (106) includes a non-volatile computer-readable medium capable of storing executable and non-executable data for access by the system controller (112) during execution of the instructions. The communicator (104) transmits and receives data from the network (122). The input/output interface (118) connects to various input and output units, such as input device (120), via a parallel port, a serial port, a keyboard port, a mouse port, a monitor port, and the like to accept commands and present information.

The system controller (112) includes a Radio Unit (RU) (not shown), a Distributed Unit (DU) (114), a centralized Unit (CU) (116), the IP address computation controller (110) and a core (not shown). In an embodiment, the Radio Unit (RU), the DU (114), the CU (116) and the core are configured based on a virtual machine or a cluster of virtual machines. The DU (114), the CU (116), the core or a combination thereof is the circuitry or instructions of the system controller (112) configured to process a stream of information from the DU (114), the CU (116), the core or a combination thereof. In another embodiments, the DU (114), the CU (116), the core or a combination thereof is configured to receive information such as information from an open-RAN network (not shown). In another embodiment, the DU (114), the CU (116), the core or a combination thereof is configured for deployment of a software service in a cloud native environment to process information in real-time. In another embodiments, the DU (114), the CU (116), the core or a combination thereof records information to the memory (106), such as a database (108) (e.g., site database or the like), and utilize information in the memory (106). In another embodiments, the DU (114), the CU (116), the core or a combination thereof includes sub-sections for performing additional functions, as described in the foregoing flow charts. In at least some embodiments, such sub-sections may be referred to by a name associated with their function.

In another embodiments, the system (100) is another device capable of processing logical functions to perform the operations herein. In at least some embodiments, the system controller (112) and the memory (106) need not be entirely separate devices but share circuitry or one or more computer-readable mediums in some embodiments. In at least some embodiments, the memory (106) includes a hard drive storing both the computer-executable instructions and the data accessed by the system controller (112), and the system controller (112) includes a combination of a central processing unit (CPU) and RAM, in which the computer-executable instructions are able to be copied in whole or in part for execution by the CPU during performance of the operations herein.

In other embodiments where the system (100) is a computer, a program that is installed in the computer is capable of causing the computer to function as or perform operations associated with the system (100) of the embodiments described herein. In another embodiments, such a program is executable by the processor (102) to cause the computer to perform certain operations associated with some or all the blocks of flowcharts and block diagrams described herein. Various embodiments of the present system are described with reference to flowcharts and block diagrams whose blocks may represent steps of processes in which operations are performed or sections of the system controller (112) responsible for performing operations. Certain steps and sections are implemented by a dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR XOR, NAND, NOR, and other logical operations, flip-flops, registers, memory elements, etc., such as field-programmable gate arrays (FPGA), programmable logic arrays (PLA), etc.

Various embodiments of the present system include a system, a method, and/or a computer program product. In some embodiments, the computer program product includes a computer readable storage medium (or media) having computer readable program instructions thereon for causing a processor to carry out aspects of the present system. In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, to perform aspects of the present system.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system. The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A system (100) for determining Internet Protocol (IP) addresses for scanning in a wireless network, wherein the system (100) comprises:

a memory (106); and a processor (102), communicatively coupled to the memory (106), configured to:

store a plurality of IP scan configurations corresponding to various network elements in a database (108), wherein each of the IP scan configuration comprises a plurality of IP parameters corresponding to each bit of an IP schema, and wherein each IP parameter of the plurality of IP parameters is defined by a user;

receive a request to determine a list of IP addresses required to be scanned corresponding to a network element;

retrieve the IP scan configuration corresponding to the network element from the database (108);

determine the list of IP addresses to be scanned based on the retrieved IP scan configuration; and display the list of IP addresses to the user, wherein each of the plurality of IP parameters corresponds to a different position within an IP address, such that a combination of the plurality of IP parameters defined by the user corresponds to a range of IP addresses having values set by the plurality of IP parameters defined by the user, and each permutation of the values set by the combination of the plurality of IP parameters defined by the user corresponds to a respective IP address.

2. The system (100) as claimed in claim 1, wherein the processor (102) is configured to scan the list of IP addresses corresponding to the network element to optimize performance of the wireless network.

3. The system (100) as claimed in claim 1, wherein the processor is configured to determine the list of IP addresses to be scanned based on the retrieved IP scan configuration by:

detecting a plurality of IP addresses corresponding to the network element; and determining the list of IP addresses to be scanned from the plurality of IP addresses based on permutation and combinations of each IP parameter of the plurality of IP parameters defined by the user in the retrieved IP scan configuration.

4. The system (100) as claimed in claim 1, wherein the processor is configured to the store the plurality of IP scan configurations corresponding to the various network elements in the database (108) by:

receiving a request to create the IP scan configuration corresponding to the network element;

receiving a set of user defined values corresponding to each IP parameter of the plurality of IP parameters corresponding to positionally encoded bits in the IP schema to create the IP scan configuration for the network element;

creating the IP scan configuration based on the received user defined values corresponding to each IP parameter of the plurality of IP parameters; and storing the defined IP scan configuration in the database (108).

5. The system (100) as claimed in claim 4, wherein the user defined values comprise at least one of a constant value which is fixed value on IP address position, a range indicating sequential variable value in specific combination of bits in IP address position, and a discrete value indicating variable values in specific combination of bits in IP address position.

6. The system (100) as claimed in claim 4, wherein the processor is configured to receive the set of user defined values corresponding to each IP parameter of the plurality of IP parameters by:

displaying a user interface corresponding to the IP scan configuration, wherein the user interface comprises an input filed corresponding to each IP parameter of the plurality of IP parameters corresponding to the positionally encoded bits in the IP schema; and receiving the user defined values as an input in the input field corresponding to each IP parameter of the plurality of IP parameters corresponding to the network element.

7. The system (100) as claimed in claim 1, wherein the processor (102) is configured to store the list of IP addresses corresponding to the network element for scanning.

8. The system (100) as claimed in claim 1, wherein the plurality of IP parameters comprises multiple sequential configuration of the user defined values.

9. The system (100) as claimed in claim 1, wherein the network element is at least one of an network interface, a category of a device in the wireless network, a type of device in the wireless network, a vendor of a device in the wireless network, a service category of a device in the wireless network, and a network interface in the wireless network.

10. A method for determining Internet Protocol (IP) addresses for scanning in a wireless network, wherein the method comprises:

storing, by a system (100), a plurality of IP scan configurations corresponding to various network elements in a database (108), wherein each of the IP scan configuration comprises a plurality of IP parameters corresponding to each bit of an IP schema, and wherein each IP parameter of the plurality of IP parameters is defined by a user;

receiving, by the system (100), a request to determine a list of IP addresses required to be scanned corresponding to a network element from the various network elements;

retrieving, by the system (100), the IP scan configuration corresponding to the network element from the database (108);

determining, by the system (100), the list of IP addresses to be scanned based on the retrieved IP scan configuration; and displaying, by the system (100), the list of IP addresses to the user, wherein each of the plurality of IP parameters corresponds to a different position within an IP address, such that a combination of the plurality of IP parameters defined by the user corresponds to a range of IP addresses having values set by the plurality of IP parameters defined by the user, and each permutation of the values set by the combination of the plurality of IP parameters defined by the user corresponds to a respective IP address.

11. The method as claimed in claim 10, wherein the method comprises scanning, by the system (100), the list of IP addresses corresponding to the network element to optimize performance of the wireless network.

12. The method as claimed in claim 10, wherein the determining, by the system (100), the list of IP addresses to be scanned based on the retrieved IP scan configuration comprises:

detecting, by the system (100), a plurality of IP addresses corresponding to the network element; and determining, by the system (100), the list of IP addresses to be scanned from the plurality of IP addresses based on permutation and combinations of each IP parameter of the plurality of IP parameters defined by the user in the retrieved IP scan configuration.

13. The method as claimed in claim 10, wherein the storing, by the system (100), the plurality of IP scan configurations corresponding to the various network elements in the database (108) comprises:

receiving, by the system (100), a request to create the IP scan configuration corresponding to the network element;

receiving, by the system (100), a set of user defined values corresponding to each IP parameter of the plurality of IP parameters corresponding to positionally encoded bits in the IP schema to create the IP scan configuration for the network element;

creating, by the system (100), the IP scan configuration based on the received user defined values corresponding to each IP parameter of the plurality of IP parameters; and storing, by the system (100), the defined IP scan configuration in the database (108).

14. The method as claimed in claim 13, wherein the user defined values comprise at least one of a constant value which is fixed value on IP address position, a range indicating sequential variable value in specific combination of bits in IP address position, and a discrete value indicating variable values in specific combination of bits in IP address position.

15. The method as claimed in claim 13, wherein the receiving, by the system (100), a set of user defined values corresponding to each IP parameter of the plurality of IP parameters comprises:

displaying, by the system (100), a user interface corresponding to the IP scan configuration, wherein the user interface comprises an input filed corresponding to each IP parameter of the plurality of IP parameters corresponding to the positionally encoded bits in the IP schema; and receiving, by the system (100), the user defined values as an input in the input field corresponding to each IP parameter of the plurality of IP parameters corresponding to the network element.

16. The method as claimed in claim 10, wherein the method comprises storing, by the system (100), the list of IP addresses corresponding to the network element for scanning.

17. The method as claimed in claim 10, wherein the plurality of IP parameters comprises multiple sequential configuration of the user defined values.

18. The method as claimed in claim 10, wherein the network element is at least one of an network interface, a category of a device in the wireless network, a type of device in the wireless network, a vendor of a device in the wireless network, a service category of a device in the wireless network, and a network interface in the wireless network.

* * * * *